(12) United States Patent
Srinivasan et al.

(10) Patent No.: US 8,861,847 B2
(45) Date of Patent: Oct. 14, 2014

(54) SYSTEM AND METHOD FOR ADAPTIVE SKIN TONE DETECTION

(71) Applicant: Intel Corporation, Santa Clara, CA (US)

(72) Inventors: Sadagopan Srinivasan, Hillsboro, OR (US); Michael E. Kounavis, Hillsboro, OR (US); Rameshkumar G. Illikkal, Portland, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 13/724,150

(22) Filed: Dec. 21, 2012

(65) Prior Publication Data

US 2014/0177955 A1 Jun. 26, 2014

(51) Int. Cl.
*G06K 9/00* (2006.01)
*G06K 9/46* (2006.01)

(52) U.S. Cl.
CPC .................................. *G06K 9/4652* (2013.01)
USPC ............ 382/165; 382/164; 382/167; 382/274

(58) Field of Classification Search
CPC ..................... G06T 7/408; G06T 2207/10024; G06T 7/0081; G06T 11/001; G06T 5/001; G06K 9/4652; G06K 9/38; H04N 1/6058; H04N 9/045
USPC ......... 382/165, 164, 162, 167, 274, 239, 282; 348/224.1, 188, 223.1, 404.1, 603; 348/E5.119, E9.04; 375/240.02
See application file for complete search history.

(56) References Cited

U.S. PATENT DOCUMENTS

| | | | | |
|---|---|---|---|---|
| 8,019,170 | B2 * | 9/2011 | Wang et al. | 382/239 |
| 8,208,758 | B2 * | 6/2012 | Wang et al. | 382/282 |
| 8,520,093 | B2 * | 8/2013 | Nanu et al. | 348/224.1 |

OTHER PUBLICATIONS

Soriano et al., "Adaptive Skin Color Modeling Using the Skin Locus for Selecting Training Pixels", The Journal of Pattern Recognition Society, May 15, 2011.
Vezhnevets, et al., "A Survey on Pixel-Based Skin Color Detection Techniques". Moscow State University.
Soriano et al., "Using the Skin Locus to Cope with Changing Illumination Conditions in Color-Based Face Tracking", University of Oulu.

* cited by examiner

*Primary Examiner* — Anh Do
(74) *Attorney, Agent, or Firm* — Grossman, Tucker, Perreault & Pfleger PLLC

(57) ABSTRACT

A system and method for detecting human skin tone in one or more images. The system includes an image processing module configured to receive an image and provide contrast enhancement of the image so as to compensate for background illumination in the image. The image processing module is further configured to detect and identify regions of the contrast-enhanced image containing human skin tone based, at least in part, on the utilization of multiple color spaces and adaptively generated thresholds for each color space. A system and method consistent with the present disclosure is configure to provide accurate detection of human skin tone while accounting for variations in skin appearance due to a variety of factors, including background illumination and objects.

26 Claims, 5 Drawing Sheets

SYSTEM AND METHOD FOR ADAPTIVE SKIN TONE DETECTION

FIELD

The present disclosure relates to image processing, and, more particularly, to a system and method for detecting human skin tone in one or more images.

BACKGROUND

The detection of human presence in images is useful in a variety of applications, such as, for example, video surveillance, face and gesture recognition, human-computer interaction, image/video indexing and retrieval and image editing. There are a variety of known approaches for detecting human presence in an image, including feature-based, motion-based and color-based approaches. Generally, feature-based approaches attempt to identify particular regions of a user's body, such as, for example, the face, based on the detection of certain features, such as the eyes, the nose and the mouth. Motion-based approaches generally operate on the principle that a moving region in an image is likely to be a region of the user's body. Color-based approaches generally attempt to detect human skin tone (also referred to herein as "skin color" and "skin pigmentation") regions in an image, which, in turn, correlates to the human presence in an image.

Skin tone detection can play a significant role in facilitating human-computer interaction. For example, skin tone detection may serve as an enabling technology for face detection, localization, recognition, and/or tracking and gesture recognition. For example, skin tone detection can be used as a pre-filter in image processing by classifying an image into skin and non-skin regions. This pre-filtering process can aid in accelerating subsequent phases of facial and/or gesture recognition algorithms by focusing these algorithms onto areas of interest (i.e. skin regions), as well as enable robust edge detection algorithms used in current image processing applications.

Images can depict visual information using various color spaces. A color space can describe the way colors are represented (e.g., using one to four values representing color components). For example, in a red-green-blue (RGB) color space, a color can be described using three values—one each for red, green, and blue. Thus, three values can be used to describe the color of each pixel in an RGB image. When an intended interpretation of a color space's components is known, the set of possible colors can be referred to as a color space. For example, the three values associated with an RGB color can be mixed additively to produce a specific color in an RGB color space. Some skin tone detection systems may provide a skin model for a specific color space and further process regions of an image using the skin model to fit any specific application.

Accurate skin tone detection, however, may be complicated by the fact that a person's skin tone may vary depending on a variety of factors, such as, for example, illumination conditions (illumination geometry and color), variations in individual skin color, background of the environment of the image, etc. For example, the appearance of skin can change in color and shape, and may be affected by occluding objects, such as, for example, clothing, hair, eyeglasses, etc. Moreover, changes in intensity, color and location of light sources can also affect skin appearance, as well as other objects within an environment that may cast shadows or reflect additional light onto a person's skin, further complicating the skin detection process. Another challenge comes from the fact that many objects in the real world might have skin-tone colors. For example, wood, leather, skin-colored clothing, hair, sand, etc.

A challenge in skin tone detection systems is to make skin detection robust so as to accommodate variations in skin appearance. Current skin tone detection systems are limited in that that they may not adequately account for the large variations in skin tone that may occur depending on the lighting and other factors in the environment. For example, some skin tone detection systems utilize a single color space while some systems use static (e.g. fixed) thresholds in multi-color spaces. However, systems relying on a single color space or static thresholds may fail to accurately detect skin tone in unconstrained imaging conditions, where skin tone can vary significantly across an image due to external factors.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a system and method for detecting human skin tone in one or more images. Skin tone can correspond to a color or set of colors within one or more color spaces that are characteristic of human flesh. Detecting skin tone in an image can include ascertaining whether an image depicts such characteristic colors.

A system consistent with the present disclosure includes an image processing module configured to process an image or series of images to detect and identify regions of the image containing human skin tone based, at least in part, on the utilization of multiple color spaces and dynamically generated thresholds for each color space. The image processing module is configured to provide contrast enhancement of the image or series of images prior to the detection and identification of human skin tone regions so as to compensate for any background illumination in the image or series of images.

A system consistent with the present disclosure is configured to provide accurate detection of human skin tone while accounting for variations in skin appearance due to a variety of factors. More specifically, the use of a skin model having multiple color spaces and adaptive thresholds allows a system consistent with the present disclosure to accommodate for variations in skin appearance of one or more persons in an image due to lighting and other factors in the environment and provide reliable and accurate detection of human skin tone. Accordingly, a system consistent with the present disclosure may improve human-computer interaction, particularly when utilized in systems related to the detection of human presence, including, but not limited to, video surveillance, face and gesture recognition, image/video indexing and retrieval and image editing.

Figure 1:
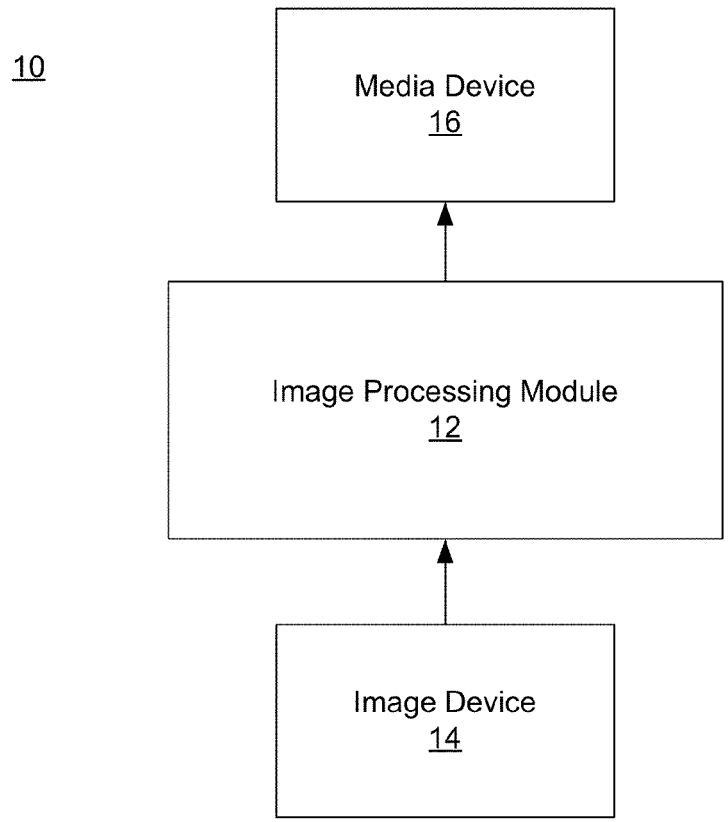
FIG. 1 is a block diagram illustrating one embodiment of a system for detecting human skin tone in an image consistent with various embodiments of the present disclosure.

Turning to FIG. 1, one embodiment of a system 10 consistent with the present disclosure is generally illustrated. The system 10 includes an image processing module 12, at least one image device 14 and a media device 16. As discussed in greater detail herein, the image processing module 12 is generally configured to receive an image or series of images from the image device 14 and process the image(s) to detect and identify regions containing human skin tone. More specifically, the image processing module 12 is configured to use multiple color spaces dynamically to detect and identify regions of the image(s) containing human skin tone with high accuracy, irrespective of lighting conditions and other factors that may affect skin appearance of one or more users.

The image processing module 12 is further configured to generate data indicative of the identified regions of the image(s) containing human skin tone, thereby indicating the presence of one or more persons in the image(s). The data may, in turn, be used to further facilitate human-computer interaction. For example, the data may be subsequently used to accelerate subsequent phases of facial and/or gesture recognition algorithms by focusing these algorithms onto areas of interest (i.e. regions of the image containing skin tone), as well as enable robust edge detection algorithms used in current image processing applications. In one embodiment, the image processing module 12 may be coupled to a media device 16 having hardware and/or software related to user identification and/or gesture recognition.

To alleviate additional processing requirements, the image processing module 12 may be optimized such that the image processing module 12 is only used to process the image to a certain extent, e.g., without requiring actual identification of particular regions of a user's body, such as, for example, the face or hands. Rather, the image processing module 12 may be utilized simply to detect and identify regions in the image(s), to a predefined level of approximation or accuracy, which contain human skin tone. As generally understood, a system 10 consistent with the present disclosure may further include other components and methods configured to identify features of a user, including the face and/or hands, as well as facial expressions and hand gestures. For example, the system 10 may further include hardware and/or software for user identification (e.g., facial and/or hand identification) and gesture recognition.

Figure 2:
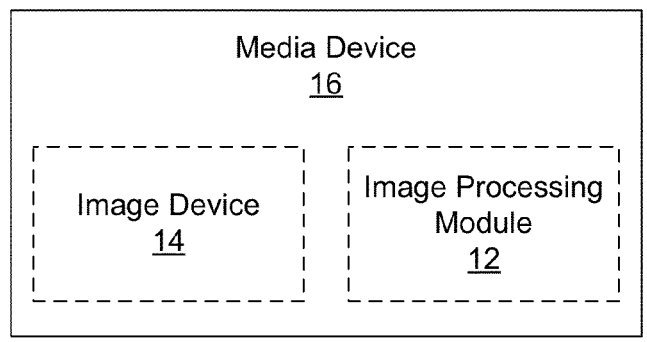
FIG. 2 is a block diagram illustrating another embodiment of a system for detecting human skin tone in an image consistent with various embodiments of the present disclosure.

In the illustrated embodiment, the media adaptation module 12, image device 14 and media device 16 are separate from one another. It should be noted that in other embodiments, as generally understood by one skilled in the art, the media device 16 may optionally include the image processing module 12 and/or image device 14, as shown in FIG. 2, for example. The optional inclusion of the image processing module 12 and/or image device 14 as part of the media device 16, rather than elements external to media device 16, is denoted in FIG. 2 with broken lines.

Figure 3:
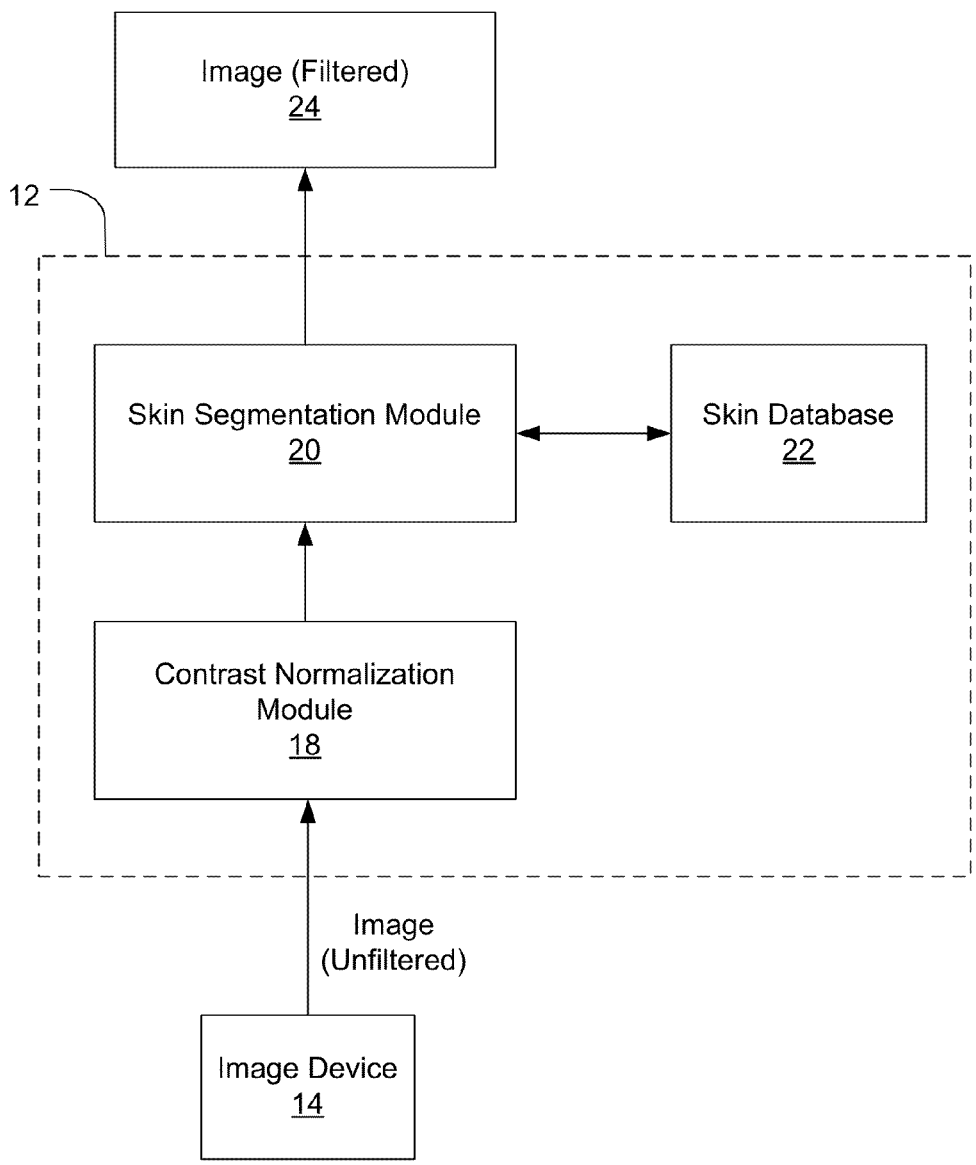
FIG. 3 is a block diagram illustrating the system of FIG. 1 in greater detail.

Turning now to FIG. 3, the system 10 of FIG. 1 is illustrated in greater detail. As previously discussed, the image processing module 12 is configured to receive an image or series of images captured by an image device 14. The image device 14 includes any device (known or later discovered) for capturing digital images representative of an environment that may include one or more persons, and may have adequate resolution for the detection and identification of human skin tone, thereby indicative of the presence of one or more persons as described herein. For the purposes of clarity and ease of description, the image device 14 will hereinafter be referred to as a camera 14. As generally understood, a system 10 consistent with the present disclosure may also include memory (e.g. computer accessible storage medium) containing one or more images stored thereon, wherein the image processing module 12 may be configured to access and receive one or more images from memory.

The camera 14 may include a still camera (e.g., camera configured to capture still photographs) or video camera (e.g., cameras configured to capture moving images comprised of a plurality of frames). The camera 14 may be configured to operate using light in the visible spectrum or with other portions of the electromagnetic spectrum (e.g., but not limited to, the infrared spectrum, ultraviolet spectrum, etc.). As shown in FIG. 2, the camera 14 may be incorporated within at least the media device 16 or the image processing module 12, or may be a separate device configured to communicate with the image processing module 12 and media device 16 via wired or wireless communication. Specific examples of a camera 14 may include wired (e.g., Universal Serial Bus (USB), Ethernet, Firewire, etc.) or wireless (e.g., WiFi, Bluetooth, etc.) web cameras (as may be associated with a personal computer and/or TV monitor), handheld device camera (e.g., cell phone camera, smart phone camera (e.g., camera associated with the iPhone®, Trio®, Blackberry®, etc.), laptop computer camera, tablet computer (e.g., but not limited to, iPad®, Galaxy Tab®, and the like), e-book reader (e.g., but not limited to, Kindle®, Nook®, and the like), etc.

Upon processing the image(s), the image processing module 12 is configured to generate data (e.g., but not limited to, a filtered image) indicative of identified regions of the image(s) containing human skin tone, thereby indicating the presence of one or more persons in the image(s). As previously discussed, the image processing module 12 may further be configured to transmit the data to the media device 16 for use in subsequent facial and/or gesture recognition analysis. The media device 16 may include hardware and/or software configured for user identification and/or gesture recognition for enhanced user interface and interaction. The media device 16 may include, but is not limited to, a television, desktop computer, laptop computer, tablet computer, smart phone (e.g., iPhones®, Android®-based phones, Blackberries®, Symbian®-based phones, Palm®-based phones, etc.), video game console, videoconferencing system, portable digital assistant (PDA), portable media player (PMP), e-book, and other computing device.

In the illustrated embodiment, the image processing module 12 includes a contrast normalization module 18 configured to receive one or more digital images captured by the camera 14. In the following embodiments described herein, the input source image received from the camera 14 is an RGB color image. However, it should be noted that other color spaces may be used consistent with the teachings herein. For example, YUV, grayscale (black-and-white), infrared, XYZ, UVW, Luv Lab, and/or other known or after-developed color space specifications may be used.

The contrast normalization module 18 is configured to enhance the contrast of one or more images received from the camera 14. In one embodiment, the contrast normalization module 18 may be configured to enhance saturation contrast of an image, as described in greater detail herein. The contrast normalization module 18 may be configured to convert an original color space of an image to a second color space having a saturation channel, wherein the saturation channel may include saturation values of all pixels of the image. For example, the contrast normalization module 18 may be configured to convert an unfiltered image from an original format (e.g. red-green-blue (RGB) color space) to a hue-saturation-value (HSV) color space.

The contrast normalization module 18 may include custom, proprietary, known and/or after-developed contrast code (or instruction sets, functions, etc.) that are generally well-defined and operable to process pixels of an image to determine whether adjustment of saturation values of pixels is necessary to optimize contrast of the image. Upon converting the image from an RGB color space to an HSV color space, the contrast normalization module 18 may be configured to construct a histogram of the saturation values of pixels of the image and compute a median saturation value based on the constructed histogram. The contrast normalization module 18 may further be configured to access information regarding each pixel of the image, wherein the information may include a saturation value and a luminance value.

The contrast normalization module 18 may be further be configured to apply contrast enhancement to each pixel based, at least in part on, the information, including the saturation and luminance values of each pixel. In one embodiment, a user may provide one or more user-provided parameters, based upon which, a function may be defined. In some embodiments, the function may be an s-curve function, such that when saturation values of respective pixels of the image are applied to the s-curve function, resulting enhanced saturation values of some of the pixels may be greater than corresponding original saturation values and enhanced saturation values of others of the pixels may be less than corresponding original saturation values.

In one embodiment, only saturation values of pixels that satisfy a luminance threshold condition may be applied to the function. For example, the contrast normalization module 18 may be configured to determine whether the luminance value of each pixel is below a lower limit threshold value, above an upper limit threshold value or within an intermediate range between the lower and upper limits. If the luminance value is below the lower limit threshold or above the upper limit threshold, then a luminance threshold condition is satisfied. In the event that the luminance threshold condition is satisfied, the contrast normalization module 18 may adjust saturation contrast by applying the saturation value of the pixel to the function to obtain an enhanced saturation value, which may result in an increase or decrease in contrast. Otherwise, if the luminance threshold condition is not satisfied (the luminance value falls within the intermediate range), the saturation value of the pixel may remain unchanged.

Enhancing the saturation contrast of the image based on satisfaction of a luminance threshold may preserve saturation values with respect to pixels with low luminance. Increasing saturation contrast may magnify hue fluctuations that are caused by low-level noise in the image. By enhancing saturation values of only the pixels of the image that satisfy the luminance threshold condition, saturation may be enhanced everywhere in the image except for darker areas, where the digital image retains only the low-level noise present in an original version of the digital image. Applying contrast enhancement to the input source image prior to any subsequent skin tone detection and processing, described in greater detail herein, may generally compensate for background illumination in the image, thereby improving the accuracy of the skin tone detection and identification.

Upon completion of contrast enhancement, the contrast normalization module 18 may be configured to convert the color space of the image back to the original color space (e.g. from HSV to RGB), wherein a contrast-enhanced, or contrast-adjusted, version of the image may then be transmitted to the media device 16 and/or may be saved to a storage device, such as, for example, a hard disk, an optical disc, a flash RAM storage device, or other type of storage device.

In the illustrated embodiment, the contrast-enhanced image may be transmitted to a skin segmentation module 20. It should be noted that the skin segmentation module 20 may be configured to receive the contrast-enhanced image in either the original format (e.g. RGB) or the second color space (e.g. HSV). The skin segmentation module 20 is generally configured to receive the contrast-enhanced image processed by the contrast normalization module 18 and detect the presence of skin tone in the image. As described in greater detail herein, the skin segmentation module 20 may be configured to process each pixel of the image and compare data related to each pixel (e.g. color values of a pixel) with a range of known skin tone values across multiple color spaces stored in a skin database 22. The skin segmentation module 20 may be further configured classify the image into skin regions (e.g. regions in which skin tone is present) and non-skin regions (e.g. regions in which skin tone is not present).

Upon processing the contrast-enhanced image, the skin segmentation module 20 may be configured to generate a filtered image 24, in which regions of the image containing skin tone are identified as such. For example, the output of the skin segmentation module 20 may include a filtered image 24 where pixels identified as containing skin tone are preserved (i.e. color values of pixel remain unchanged from the contrast-enhanced image) and pixels identified as not containing skin tone are assigned a value to indicate lack of skin tone (e.g. black). The filtered image 24 may then be transmitted to the media device 16 for presentation and/or further processing (e.g., face and/or gesture recognition, etc.).

Figure 4:
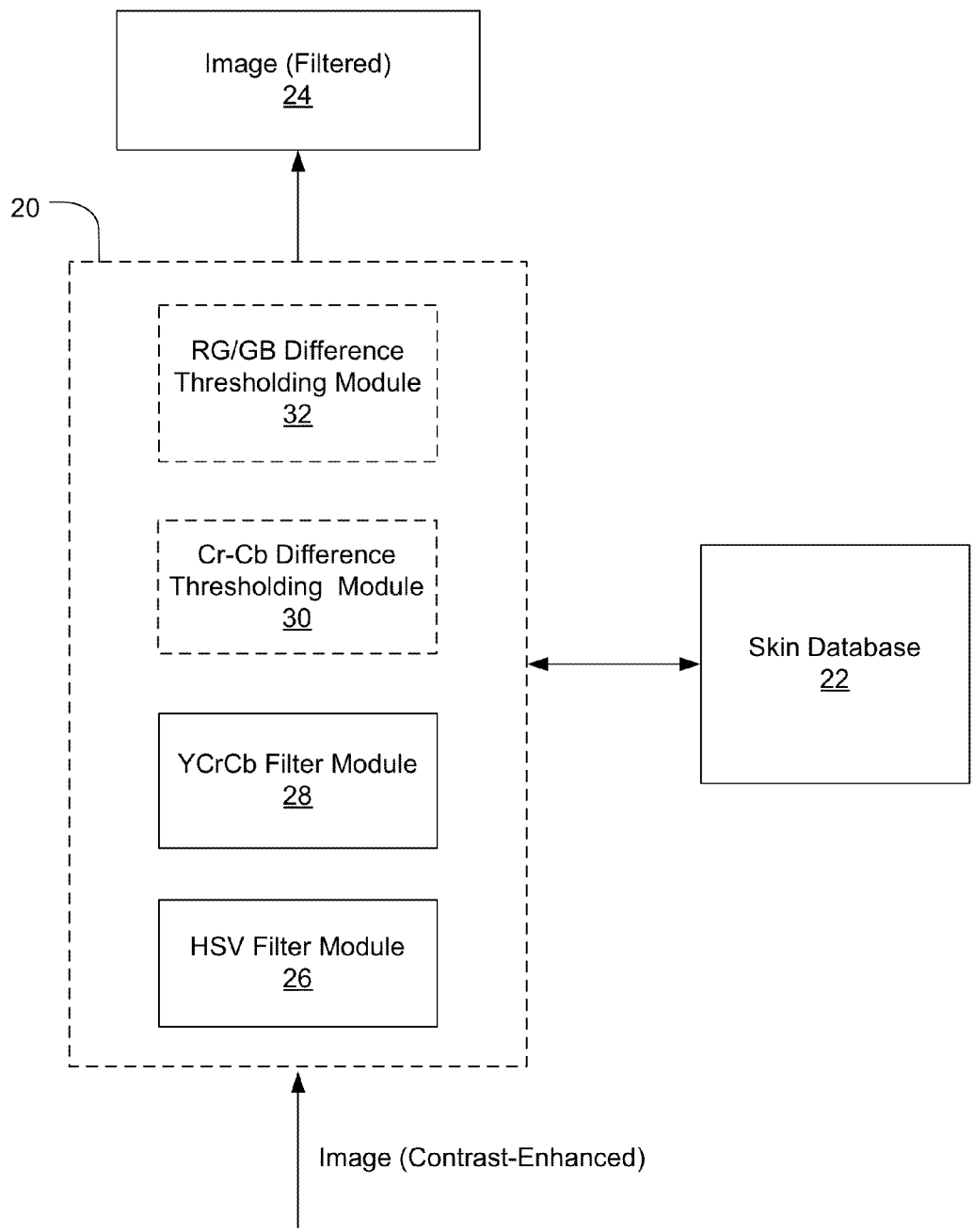
FIG. 4 is a block diagram illustrating one embodiment of a skin segmentation module consistent with various embodiments of the present disclosure.

Turning to FIG. 4, a block diagram illustrating one embodiment of a skin segmentation module 20 consistent with one embodiment of the present disclosure is generally illustrated. As previously described, the image processing module 12 includes a skin database 22. The skin database 22 includes a range of values that correspond to known skin tones within multiple color spaces. The range of values may be referred to hereinafter as a skin tone boundary, having a lower limit threshold and an upper limit threshold. For example, the database 22 may be created based on the processing of skin patches from a database of images. The skin-colored patches may be representative of a variety of different skin tones (e.g. African, Asian, European) under different illumination conditions. The skin patches may be processed under a variety of different color spaces so as to determine skin tone boundaries for each color space. For example, the skin database 22 may include skin tone boundaries for at least RGB, HSV and YCrCb color spaces. As generally understood, the skin tone boundaries may be determined based on generating histograms of the skin patches and determining a Gaussian distribution of values for each color space. For example, the skin tone boundaries may be based, at least in part, on a hue distribution, chroma red (Cr) distribution, chroma blue (Cb) distribution, as well as chroma difference (Cr–Cb) distribution.

In the illustrated embodiment, the skin segmentation module 20 may include a HSV filter module 26 and a YCrCb filter module 28. Upon receiving the contrast-enhanced image, the HSV and YCrCb filter modules 26, 28 are configured to convert the contrast-enhanced image to HSV and YCrCb color spaces and further enable the processing of pixels for detection and identification of regions of the image containing skin tone within multiple color spaces. The skin segmentation module 20 is configured to first select regions of the image from which to select and process pixels to generate a histogram. In one embodiment, the skin segmentation module 20 may be configured to first start with processing the center region of the image, a region in which a person may generally be present. Upon processing the center region, the skin segmentation module 20 may then process regions immediately surrounding the center region.

The skin segmentation module 20 may include custom, proprietary, known and/or after-developed skin identification code (or instruction sets) that are generally well-defined and operable to distinguish skin tones or colors from other areas of the image. The skin segmentation module 20 may be configured to process pixels of a region of the image and identify values of each pixel for each color space, such as, for example red-green (RG) and green-blue (GB) values (for RGB color space), hue, saturation and luminance values (for the HSV color space) and chroma red (Cr) and chroma blue (Cb) values (for the YCrCb color space). The skin segmentation module 20 is further configured to generate histograms for one or more values and classify pixels as either skin or non-skin based on skin tone boundaries of the skin database 22. For example, the skin segmentation module 20 may be configured to generate a histogram of Cr and Cb values. The skin segmentation module 20 may further be configured to label pixels as skin if the Cr and Cb values are within a Cr and Cb boundary of the skin database 22. As such, the skin segmentation module 20 may be configured to classify the image into skin regions (e.g. regions in which skin tone is present) and non-skin regions (e.g. regions in which skin tone is not present).

Upon classifying regions of the image as skin regions or non-skin regions, the skin segmentation module 20 is further configured to further process skin regions to improve upon and provide a more robust and accurate skin tone detection system. In particular, in the first pass, the image was classified into skin and non-skin regions, wherein skin regions were identified based on a comparison of one or more generated histograms with corresponding skin tone boundaries of the skin database 22. It should be noted that each region of the image classified as containing skin tone includes maximum and minimum observed values (e.g., Cr and Cb values) that fall within skin tone boundaries of the skin database 22. In a subsequent pass of the image, the skin segmentation module 20 may be configured to identify a range of values based on the maximum and minimum observed values and apply the identified range of values across all regions of the image, including skin regions and non-skin regions, for further processing of the image to detect skin tone.

For example, the skin segmentation module 20 may be configured to identify a range of chroma (Cr and Cb) values based on maximum and minimum observed Cr and Cb values of one or more skin regions of the image. In a subsequent processing of the image, the identified range of Cr and Cb values are now used to determine whether a pixel contains skin tone (e.g. determine whether Cr and Cb values of pixel falls within identified range of Cr and Cb values). It should be noted that the skin segmentation module 20 may be configured to make multiple passes (processing of image) to further refine the detection process.

The adaptive nature of modifying skin tone boundaries, particularly updating the lower limit and upper limit thresholds of any given boundary on each subsequent pass, increases the robustness of skin detection. In particular, the skin segmentation module may be configured to provide more accurate results for a specific image and under specific lighting conditions.

The approach discussed above may be further augmented with other color-related thresholds, in addition to the normalized chroma (Cr and Cb) thresholds (e.g., maximum and minimum observed values), based on observations, such as chroma difference (Cr–Cb) and Red-Green, Green-Blue difference (RG/GB) to make the skin tone detection process more robust. For example, as shown, the skin segmentation module 20 may further include Cr–Cb and RG/GB difference thresholding modules 30, 32. The modules 30, 32 may be configured to determine maximum and minimum observed Cr–Cb difference values and RG/GB difference values, respectively, of each skin region that fall within skin tone boundaries of the skin database 22. Accordingly, in a subsequent pass of the image, the skin segmentation module 20 may be configured to identify a range of Cr–Cb and RG/GB values based on the maximum and minimum observed values and apply the identified range of Cr–Cb and RG/GB values across all regions of the image, including skin regions and non-skin regions, for further processing of the image in a similar fashion described above in relation to application of the normalized chroma thresholds. The processing of an image with additional color-related thresholds, such as chroma difference and/or RG/GB difference, further increase the robustness of the image processing module.

Figure 5:
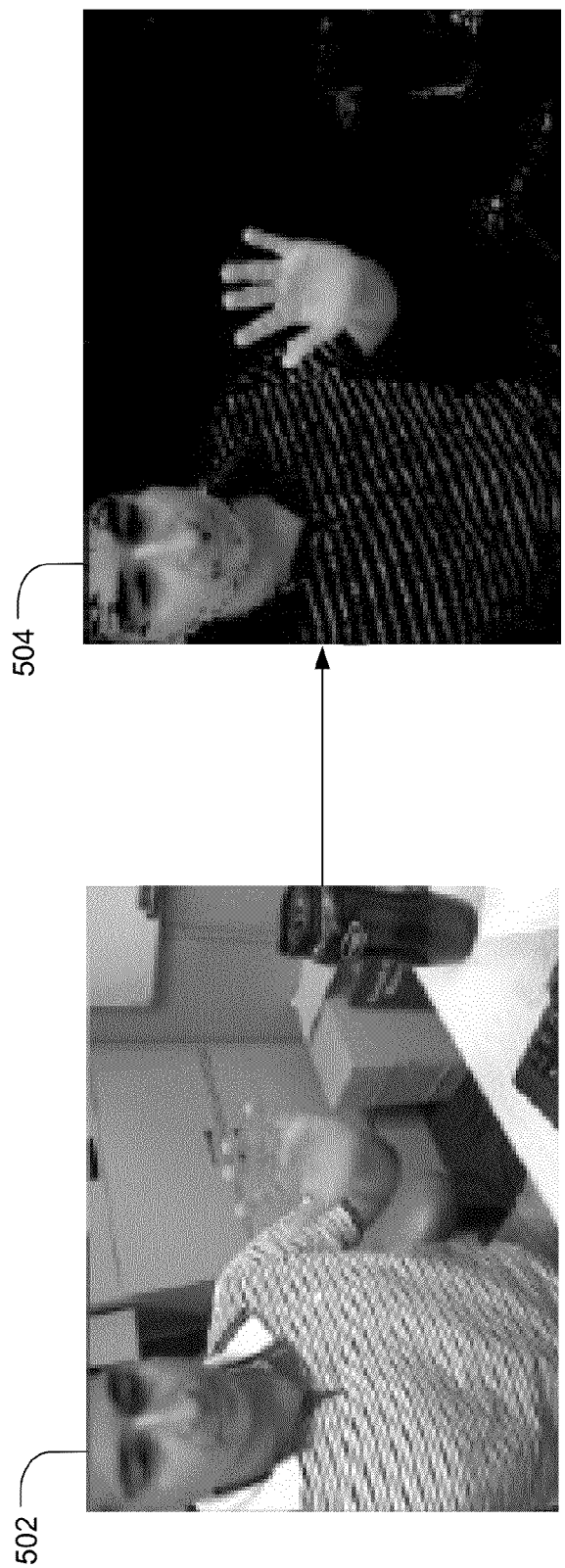
FIG. 5 depicts an image before and after processing by way of the image processing module consistent with the present disclosure.

FIG. 5 depicts an image before and after undergoing a method of skin tone detection consistent with the present disclosure. As shown, an unfiltered image 502 (e.g. input source image from the camera 14) includes a person within an environment including background illumination and objects. Upon receiving the unfiltered image 502, the image processing module 12 is configured to perform the skin tone detection process described herein, and further generate a filtered image 504, in which regions of the image containing skin tone are identified as such. For example, as shown in the filtered image 504, pixels identified as containing skin tone remain in the image 504 and pixels identified as not containing skin tone are assigned a value to indicate lack of skin tone (e.g. black). As shown, processing of the unfiltered image 502 in accordance with a system and method of skin tone detection consistent with the present disclosure results in a filtered image 504 in which skin color is recognized with minimal false positives (e.g., stripes in the shirt) which can later be pruned with known smoothening functions.

Figure 6:
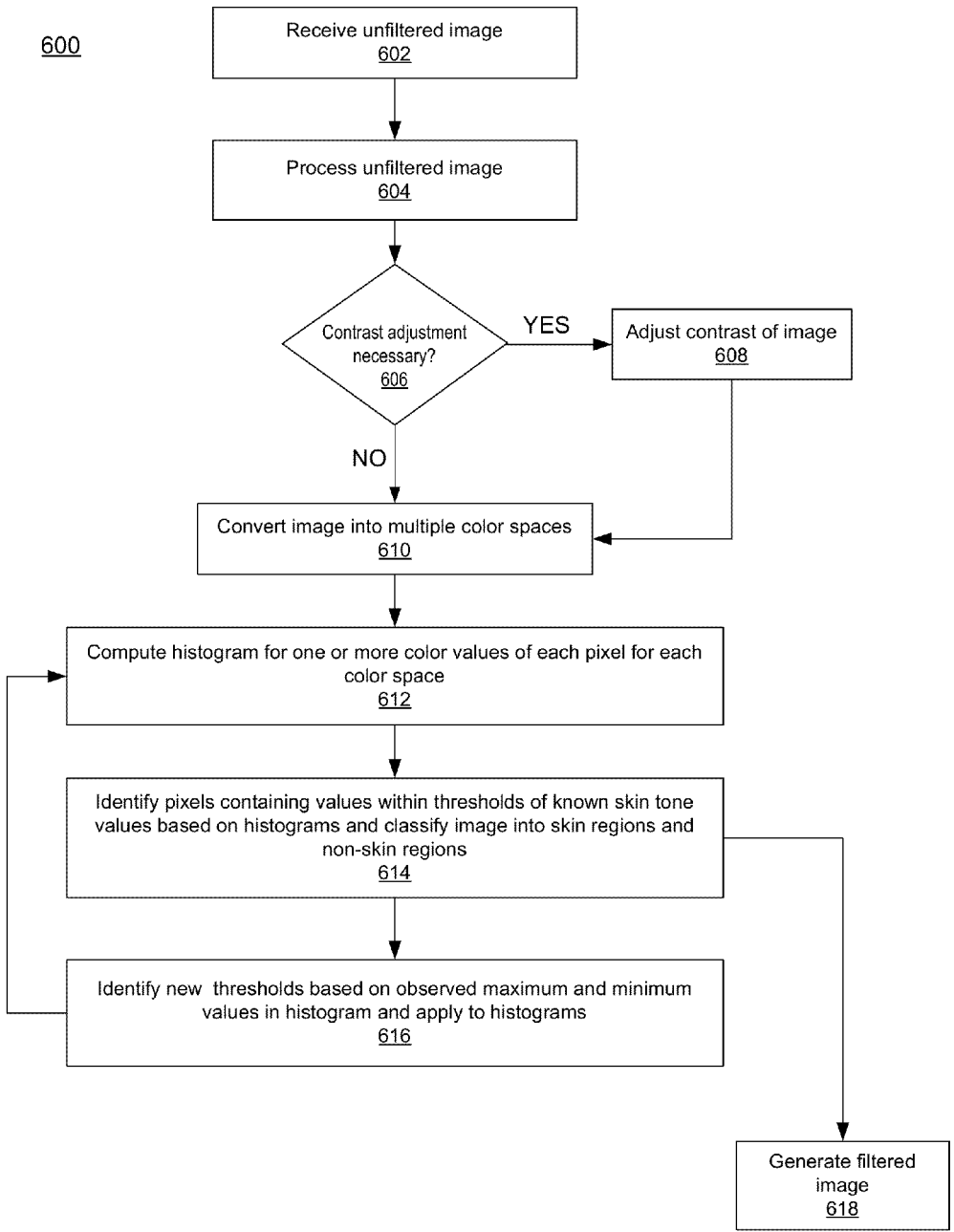
FIG. 6 is a flow diagram illustrating one embodiment for detecting human skin tone consistent with present disclosure.

Turning now to FIG. 6, a flowchart of one embodiment of a method 600 for detecting human skin tone consistent with the present disclosure is illustrated. The method 600 includes receiving an image (operation 602) and processing the image (604). During the processing of the image, a determination may then be made in operation 606 as to whether contrast of the image needs to be adjusted. If it is determined in operation 606 that contrast adjustment is no necessary, then the image is then converted into multiple color spaces in operation 610. If it is determined in operation 606 that the image needs contrast adjustment, then contrast of the image is adjusted. In particular, the saturation contrast of the image may be adjusted (e.g. either increase or decrease saturation values of pixels of the image). The contrast-enhanced image is then converted into multiple color spaces in operation 610.

The image is converted into multiple color spaces in operation 610. In particular, the image is converted into at least HSV and YCrCb color spaces. In operation 612, histograms for one or more color values of the pixels for each color space are computed. In operation 614, the histograms are used in determining pixels that contain values within thresholds of known skin tone values and the image is further classified into skin regions (e.g. regions containing pixels where skin tone is present) and non-skin regions (e.g. regions containing pixels where skin tone is not present). In operation 616, new thresholds are identified based on observed maximum and minimum (upper and lower threshold limits) in the histograms and the new thresholds are applied to the histograms.

As shown, upon completing operation 616, operations 612 and 614 may then repeat based on the newly applied thresholds identified in operation 616, thereby constituting one complete pass of the image filtering process consistent with the present disclosure. At least upon a complete pass, a filtered image is then generated in operation 618, in which regions of the image containing skin tone are identified as such. However, it should be noted that the image may be further processed so as to complete multiple complete passes, wherein operations 612 through 616 may continue indefinitely, further improving the accuracy of detecting and identifying skin regions and non-skin regions in the image.

While FIG. 6 illustrates method operations according various embodiments, it is to be understood that in any embodiment not all of these operations are necessary. Indeed, it is fully contemplated herein that in other embodiments of the present disclosure, the operations depicted in FIG. 6 may be combined in a manner not specifically shown in any of the drawings, but still fully consistent with the present disclosure. Thus, claims directed to features and/or operations that are not exactly shown in one drawing are deemed within the scope and content of the present disclosure.

It should be noted that, in addition to detecting the presence of human skin tone, a system and method consistent with the present disclosure may also be configured to detect any desired color tone depending on the particular application. For example, a system consistent with the present disclosure may be used in athletic events, such as a televised broadcast of a basketball game. The system may be configured to detect the presence of color tone in the video (e.g. series of images) corresponding to a known color tone range of the basketball, thereby indicating the presence of the basketball in the image. Accordingly, the system may aid in further tracking systems configured to track the movement of the basketball.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect of the present disclosure, there is provided an apparatus for detecting human skin tone in an image. The apparatus includes a contrast normalization module configured to receive an image and enhance contrast of the image and generate a contrast-enhanced image. The apparatus further includes a skin segmentation module configured to convert the contrast-enhanced image into multiple color spaces and process each pixel of the image to identify values of each pixel corresponding to each of the multiple color spaces, the skin segmentation module further configured to classify the image into skin and non-skin regions based on a comparison of the identified values of each pixel with corresponding values of skin tone boundaries of a skin database. The skin segmentation module is further configured to generate output data indicative of the identified skin regions and non-skin regions of the image.

Another example apparatus includes the foregoing components and the multiple color spaces are selected from the group consisting of RGB, HSV, YCrCb and XYZ color spaces.

Another example apparatus includes the foregoing components and the values of each pixel are selected from the group consisting of red-green (RG) and green-blue (GB) values, hue (H), saturation (S) and luminance (V) values and chroma red (Cr) and chroma blue (Cb) values.

Another example apparatus includes the foregoing components and each skin tone boundary stored in the skin database includes a range of values having a lower limit threshold and an upper limit threshold, each skin tone boundary generated based on processed images containing known skin patches under varying lighting conditions.

Another example apparatus includes the foregoing components and the skin tone boundaries are based on at least one of hue distribution, chroma red (Cr) distribution, chroma blue (Cb) distribution and chroma difference (Cr–Cb) distribution.

Another example apparatus includes the foregoing components and the skin segmentation module is configured to generate histograms for the identified values of each pixel for each color space and compare each of the histograms with skin tone boundaries having corresponding values to identify pixels having values within the lower limit and upper limit thresholds of the skin tone boundaries.

Another example apparatus includes the foregoing components and if values of a pixel are within the lower and upper limit thresholds of a corresponding skin tone boundary, the pixel is classified as having skin tone and if values of a pixel are outside of the lower and upper limit thresholds of a corresponding skin tone boundary, the pixel is classified as being devoid of skin tone.

Another example apparatus includes the foregoing components and the skin regions of the image contain one or more pixels classified as having skin tone and the non-skin regions of the image contain one or more pixels classified as being devoid of skin tone.

Another example apparatus includes the foregoing components and the skin segmentation module is further configured to identify minimum and maximum observed values of histograms of the pixels within each skin region and apply the identified minimum and maximum observed values to corresponding skin tone boundaries, thereby adaptively modifying the lower and upper limit thresholds to include the identified minimum and maximum values, respectively, and updating the skin tone boundaries.

Another example apparatus includes the foregoing components and the skin segmentation module is further configured to process pixels of the image to identify skin and non-skin regions based on the updated skin tone boundaries.

Another example apparatus includes the foregoing components and the contrast normalization module is configured to convert the image to a color space having a saturation channel and enhance saturation contrast of the image.

Another example apparatus includes the foregoing components and the output data includes a filtered image wherein values of each pixel within the identified skin regions are preserved and values of each pixel within the identified non-skin regions are adjusted to provide visual indication of a lack of skin tone in non-skin regions of the filtered image.

According to another aspect of the present disclosure, there is provided a system for detecting human skin tone in an image. The system includes a camera configured to capture one or more images and an image processing module configured to detect the presence of skin tone in the image. The image processing module includes a contrast normalization module configured to receive the image and enhance contrast of the image and generate a contrast-enhanced image. The image processing module further includes a skin segmentation module configured to convert the contrast-enhanced image into multiple color spaces and process each pixel of the image to identify values of each pixel corresponding to each of the multiple color spaces, the skin segmentation module further configured to classify the image into skin and non-skin regions based on a comparison of the identified values of each pixel with corresponding values of skin tone boundaries of a skin database. The skin segmentation module is further configured to generate output data indicative of the identified skin regions and non-skin regions of the image. The system further includes a media device configured to receive the output data from the image processing module for presentation or further processing.

Another example system includes the foregoing components and the multiple color spaces are selected from the group consisting of RGB, HSV, YCrCb and XYZ color spaces and the values of each pixel are selected from the group consisting of red-green (RG) and green-blue (GB) values, hue (H), saturation (S) and luminance (V) values and chroma red (Cr) and chroma blue (Cb) values.

Another example system includes the foregoing components and each skin tone boundary stored in the skin database includes a range of values having a lower limit threshold and an upper limit threshold, each skin tone boundary generated based on processed images containing known skin patches under varying lighting conditions.

Another example system includes the foregoing components and the skin segmentation module is configured to generate histograms for the identified values of each pixel for each color space and compare each of the histograms with skin tone boundaries having corresponding values to identify pixels having values within the lower limit and upper limit thresholds of the skin tone boundaries.

Another example system includes the foregoing components and if values of a pixel are within the lower and upper limit thresholds of a corresponding skin tone boundary, the pixel is classified as having skin tone and if values of a pixel are outside of the lower and upper limit thresholds of a corresponding skin tone boundary, the pixel is classified as being devoid of skin tone.

Another example system includes the foregoing components and the skin segmentation module is further configured to identify minimum and maximum observed values of histograms of the pixels within each skin region and apply the identified minimum and maximum observed values to corresponding skin tone boundaries, thereby adaptively modifying the lower and upper limit thresholds to include the identified minimum and maximum values, respectively, and updating the skin tone boundaries.

Another example system includes the foregoing components and the skin segmentation module is further configured to process pixels of the image to identify skin and non-skin regions based on the updated skin tone boundaries.

Another example system includes the foregoing components and the output data includes a filtered image wherein values of each pixel within the identified skin regions are preserved and values of each pixel within the identified non-skin regions are adjusted to provide visual indication of a lack of skin tone in non-skin regions of the filtered image.

According to another aspect, there is provided at least one computer accessible medium including instructions stored thereon. When executed by one or more processors, the instructions may cause a computer system to perform operations for detecting human skin tone in an image. The operations include receiving an image, enhancing contrast of the image and generating a contrast-enhanced image, converting the contrast-enhanced image into multiple color spaces, processing each pixel of the image to identify values for each color space, generating histograms for one or more values of each pixel for each color space and comparing the histograms with skin tone boundaries having known skin tone values to identify pixels containing values within lower and upper limit thresholds of the skin tone boundaries, classifying the image into skin regions and non-skin regions based on the comparison of the histograms with the skin tone boundaries, and generating output data indicative of the identified skin regions and non-skin regions of the image.

Another example computer accessible medium includes the foregoing operations and further includes identifying new lower and upper limit thresholds for one or more skin tone boundaries based on observed minimum and maximum values of one or more histograms and updating the skin tone boundaries based on new lower and upper limit thresholds.

Another example computer accessible medium includes the foregoing operations and further includes generating histograms for one or more values of each pixel for each color space and comparing the histograms with updated skin tone boundaries.

According to another aspect of the present disclosure, there is provided a method for detecting human skin tone in an image. The method includes receiving and enhancing, by a contrast normalization module, contrast of an image and generating a contrast-enhanced image and converting, by a skin segmentation module, the contrast-enhanced image into multiple color spaces and processing each pixel of the image to identify values for each color space. The method further includes generating, by the skin segmentation module, histograms for one or more values of each pixel for each color space and comparing the histograms with skin tone boundaries, of a skin tone database, having known skin tone values to identify pixels containing values within lower and upper limit thresholds of the skin tone boundaries. The method further includes classifying, by the skin segmentation module, the image into skin regions and non-skin regions based on the comparison of the histograms with the skin tone boundaries and generating output data indicative of the identified skin regions and non-skin regions of the image.

Another example method includes the foregoing operations and further includes identifying, by the skin segmentation module, new lower and upper limit thresholds for one or more skin tone boundaries based on observed minimum and maximum values of one or more histograms and updating the skin tone boundaries based on new lower and upper limit thresholds.

Another example method includes the foregoing operations and further includes generating, by the skin segmentation module, histograms for one or more values of each pixel for each color space and comparing the histograms with updated skin tone boundaries.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present disclosure should not be limited by any of the above-described exemplary embodiments, but should be defined only in accordance with the following claims and their equivalents.

What is claimed is:

1. An apparatus for detecting human skin tone in an image, said apparatus comprising:
    a contrast normalization module configured to receive an image and enhance contrast of said image and generate a contrast-enhanced image; and
    a skin segmentation module configured to convert said contrast-enhanced image into multiple color spaces and process each pixel of said image to identify values of each pixel corresponding to each of said multiple color spaces, said skin segmentation module further configured to classify said image into skin and non-skin regions based on a comparison of said identified values of each pixel with corresponding values of skin tone boundaries of a skin database;
    wherein said skin segmentation module is further configured to generate output data indicative of said identified skin regions and non-skin regions of said image.

2. The apparatus of claim 1, wherein said multiple color spaces are selected from the group consisting of RGB, HSV, YCrCb and XYZ color spaces.

3. The apparatus of claim 2, wherein said values of each pixel are selected from the group consisting of red-green (RG) and green-blue (GB) values, hue (H), saturation (S) and luminance (V) values and chroma red (Cr) and chroma blue (Cb) values.

4. The apparatus of claim 2, wherein each skin tone boundary stored in said skin database comprises a range of values having a lower limit threshold and an upper limit threshold, each skin tone boundary generated based on processed images containing known skin patches under varying lighting conditions.

5. The apparatus of claim 4, wherein said skin tone boundaries are based on at least one of hue distribution, chroma red (Cr) distribution, chroma blue (Cb) distribution and chroma difference (Cr–Cb) distribution.

6. The apparatus of claim 4, wherein said skin segmentation module is configured to generate histograms for said identified values of each pixel for each color space and compare each of said histograms with skin tone boundaries having corresponding values to identify pixels having values within the lower limit and upper limit thresholds of said skin tone boundaries.

7. The apparatus of claim 6, wherein, if values of a pixel are within said lower and upper limit thresholds of a corresponding skin tone boundary, said pixel is classified as having skin tone and if values of a pixel are outside of said lower and upper limit thresholds of a corresponding skin tone boundary, said pixel is classified as being devoid of skin tone.

8. The apparatus of claim 7, wherein said skin regions of said image contain one or more pixels classified as having skin tone and said non-skin regions of said image contain one or more pixels classified as being devoid of skin tone.

9. The apparatus of claim 6, wherein said skin segmentation module is further configured to identify minimum and maximum observed values of histograms of said pixels within each skin region and apply said identified minimum and maximum observed values to corresponding skin tone boundaries, thereby adaptively modifying the lower and upper limit thresholds to include said identified minimum and maximum values, respectively, and updating said skin tone boundaries.

10. The apparatus of claim 9, wherein said skin segmentation module is further configured to process pixels of said image to identify skin and non-skin regions based on said updated skin tone boundaries.

11. The apparatus of claim 1, wherein said contrast normalization module is configured to convert said image to a color space having a saturation channel and enhance saturation contrast of said image.

12. The apparatus of claim 1, wherein said output data includes a filtered image wherein values of each pixel within the identified skin regions are preserved and values of each pixel within the identified non-skin regions are adjusted to provide visual indication of a lack of skin tone in non-skin regions of the filtered image.

13. A system for detecting human skin tone in an image, said system comprising:
   a camera configured to capture one or more images;
   an image processing module configured to detect the presence of skin tone in said image, said image processing module comprising:
      a contrast normalization module configured to receive said image and enhance contrast of said image and generate a contrast-enhanced image; and
      a skin segmentation module configured to convert said contrast-enhanced image into multiple color spaces and process each pixel of said image to identify values of each pixel corresponding to each of said multiple color spaces, said skin segmentation module further configured to classify said image into skin and non-skin regions based on a comparison of said identified values of each pixel with corresponding values of skin tone boundaries of a skin database;
      wherein said skin segmentation module is configured to generate output data indicative of said identified skin regions and non-skin regions of said image; and
   a media device configured to receive said output data from said image processing module for presentation or further processing.

14. The system of claim 13, wherein said multiple color spaces are selected from the group consisting of RGB, HSV, YCrCb and XYZ color spaces and said values of each pixel are selected from the group consisting of red-green (RG) and green-blue (GB) values, hue (H), saturation (S) and luminance (V) values and chroma red (Cr) and chroma blue (Cb) values.

15. The system of claim 14, wherein each skin tone boundary stored in said skin database comprises a range of values having a lower limit threshold and an upper limit threshold, each skin tone boundary generated based on processed images containing known skin patches under varying lighting conditions.

16. The system of claim 15, wherein said skin segmentation module is configured to generate histograms for said identified values of each pixel for each color space and compare each of said histograms with skin tone boundaries having corresponding values to identify pixels having values within the lower limit and upper limit thresholds of said skin tone boundaries.

17. The system of claim 16 wherein, if values of a pixel are within said lower and upper limit thresholds of a corresponding skin tone boundary, said pixel is classified as having skin tone and if values of a pixel are outside of said lower and upper limit thresholds of a corresponding skin tone boundary, said pixel is classified as being devoid of skin tone.

18. The system of claim 16, wherein said skin segmentation module is further configured to identify minimum and maximum observed values of histograms of said pixels within each skin region and apply said identified minimum and maximum observed values to corresponding skin tone boundaries, thereby adaptively modifying the lower and upper limit thresholds to include said identified minimum and maximum values, respectively, and updating said skin tone boundaries.

19. The system of claim 18, wherein said skin segmentation module is further configured to process pixels of said image to identify skin and non-skin regions based on said updated skin tone boundaries.

20. The system of claim 13, wherein said output data includes a filtered image wherein values of each pixel within the identified skin regions are preserved and values of each pixel within the identified non-skin regions are adjusted to provide visual indication of a lack of skin tone in non-skin regions of the filtered image.

21. At least one non-transitory computer readable storage medium storing instructions which, when executed by a machine, cause the machine to perform operations for detecting human skin tone in an image, said operations comprising:
   receiving an image;
   enhancing contrast of said image and generating a contrast-enhanced image;
   converting said contrast-enhanced image into multiple color spaces;
   processing each pixel of said image to identify values for each color space;
   generating histograms for one or more values of each pixel for each color space and comparing said histograms with skin tone boundaries having known skin tone values to identify pixels containing values within lower and upper limit thresholds of said skin tone boundaries;
   classifying said image into skin regions and non-skin regions based on said comparison of said histograms with said skin tone boundaries; and
   generating output data indicative of said identified skin regions and non-skin regions of said image.

22. The non-transitory computer readable storage medium of claim 21, further comprising:
   identifying new lower and upper limit thresholds for one or more skin tone boundaries based on observed minimum and maximum values of one or more histograms; and
   updating said skin tone boundaries based on new lower and upper limit thresholds.

23. The non-transitory computer readable storage medium of claim 22, further comprising:
   generating histograms for one or more values of each pixel for each color space and comparing said histograms with updated skin tone boundaries.

24. A method for detecting human skin tone in an image, said method comprising:
   receiving and enhancing, by a contrast normalization module, contrast of an image and generating a contrast-enhanced image;
   converting, by a skin segmentation module, said contrast-enhanced image into multiple color spaces and processing each pixel of said image to identify values for each color space;
   generating, by said skin segmentation module, histograms for one or more values of each pixel for each color space and comparing said histograms with skin tone boundaries, of a skin tone database, having known skin tone values to identify pixels containing values within lower and upper limit thresholds of said skin tone boundaries;
   classifying, by said skin segmentation module, said image into skin regions and non-skin regions based on said comparison of said histograms with said skin tone boundaries; and generating output data indicative of said identified skin regions and non-skin regions of said image.

25. The method of claim 24, further comprising:

identifying, by said skin segmentation module, new lower and upper limit thresholds for one or more skin tone boundaries based on observed minimum and maximum values of one or more histograms; and updating said skin tone boundaries based on new lower and upper limit thresholds.

26. The method of claim 25, further comprising:

generating, by said skin segmentation module, histograms for one or more values of each pixel for each color space and comparing said histograms with updated skin tone boundaries.

* * * * *